United States Patent Office 3,419,903
Patented Dec. 31, 1968

3,419,903
PROCESS FOR PREPARATION OF SUBSTITUTED 2,3 - BISHYDROXYMETHYLBICYCLO(2.2.1) - 2,5-HEPTADIENE
Paul E. Hoch, Youngstown, N.Y., assignor to Hooker Chemical Corporation, Niagara Falls, N.Y., a corporation of New York
No Drawing. Filed July 29, 1963, Ser. No. 298,417
7 Claims. (Cl. 260—617)

The present invention is concerned with a novel process for the preparation of a substituted 2,3-bishydroxymethylbicyclo(2.2.1) - 2,5 - heptadiene. More specifically, the invention relates to the reaction of polyhalogenated cyclopentadiene and an alkyne diol.

In accordance with the present invention there is provided a method for the preparation of a substituted 2,3-bishydroxymethylbicyclo(2.2.1) - 2,5 - heptadiene comprising reacting a compound as represented by the formula

with an alkyne diol and in the presence of an alcohol wherein the substituent X is halogen and the substituent Y is selected from the group consisting of halogen, hydrogen and alkoxy.

The reaction occurring is exemplified by the following equation, which is not intended to be limitative:

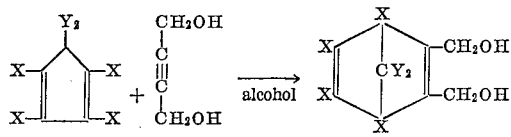

wherein the substituent X is a halogen atom and Y is a substituent selected from the group consisting of halogen, hydrogen and alkoxy. As employed throughout the specification and the claims the term "halo" signifies chloro, bromo, the fluoro-substituted cyclopentadiene wherein all of the hydrogens are replaced by one or more of the above mentioned halogens. The preferred polyhalogenated cyclopentadiene for reasons of costs and its availability is hexachlorocyclopentadiene.

Illustrative examples of the polyhalogenated cyclopentadiene starting reagent include hexachlorocyclopentadiene, hexabromocyclopentadiene, tetrachlorodifluorocyclopentadiene, tetrachlorodibromocyclopentadiene, tetrabromodichlorocyclopentadiene, tetrachlorodihydrocyclopentadiene, tetrachlorodimethoxycyclopentadiene and the like. It is, of course, appreciated that other polyhalogenated cyclopentadienes may be employed which do not adversely affect the reaction mechanism.

The alcohols which may be utilized in practicing the process of this invention can be represented by the formula ROH, wherein R is an organic radical of 1 to 20 carbon atoms selected from the group consisting of (1) Alkyl, preferably of 1 to 18 carbon atoms, in various isomer forms, such as methyl, ethyl, butyl, hexyl, amyl, octyldecyl and the like.

(2) Aralkyl, preferably of 7 to 20 carbon atoms, such as alkyl phenyl, benzyl, alpha-methyl benzyl and cumyl;

(3) Other alcohols which will act in the manner as described herein such as the cycloalkanols of 6 to 18 carbon atoms, e.g., cyclohexanol, cyclopentanol, can be employed.

This reaction has broader application to and is applicable to the utilization of other alkyne diols, such as pentyne diol, hexyne diol and the like. Other suitable alkyne diols can also be employed.

The temperature employed in effecting the reaction is generally in the range of about 100 degrees centigrade to about 200 degrees centigrade with the preferred temperature being in the range of 140 degrees centigrade to 160 degrees centigrade. However, other temperatures which do not adversely effect the reaction may be employed.

The molar ratio of perhalogenated cyclopentadiene to alkyne diol is generally in the range of 0.5 to 3 moles of perhalogenated cyclopentadiene to about 1 mole of alkyne diol with the preferred molar ratio being about 1.5 moles of hexahalocyclopentadiene to 1 mole of alkyne diol. Other molar ratios can also be utilized.

The molar ratio of polyhalogenated cyclopentadiene to alcohol is generally in the range of about 20 to about 150 milliliters of alcohol to 1 gram mole of polyhalogenated cyclopentadiene with the preferred ratio being about 70 milliliters of alcohol to a gram mole of polyhalogenated cyclopentadiene.

The product is obtained by ordinary filtration methods such as mechanical, centrifugal and the like and purified by purification methods known in the art such as crystallization, distillation and the like.

Illustrative examples of the products contemplated by this invention are as follows, it being understood that the list is not intended to be limitative.

(1)

Cl, Cl, Cl, Cl, CCl₂, CH₂OH, CH₂OH 1,4,5,6,7,7-hexachloro-2,3-bishydroxymethylbicyclo (2.2.1)-2,5-heptadiene (2)

Cl, Cl, Cl, CF₂, CH₂OH, CH₂OH 1,4,5,6-tetrachloro-7,7-difluoro-2,3-bishydroxymethyl-bicyclo(2.2.1)-2,5-heptadiene (3)

Cl, Cl, CHCl, CH₂OH, CH₂OH 1,4,5,6,7-pentachloro-2,3-bishydroxymethylbicyclo (2.2.1)-2,5-heptadiene (4)

Cl, Cl, CH₂, CH₂OH, CH₂OH 1,4,5,6-tetrachloro-2,3-bishydroxymethylbicyclo (2.2.1)-2,5-heptadiene (5)

Br, Br, Br, Br, CBr₂, CH₂OH, CH₂OH 1,4,5,6,7,7-hexabromo-2,3-bishydroxymethylbicyclo (2.2.1)-2,5-heptadiene (6)

Cl, Cl, C(OCH₃)₂, CH₂OH, CH₂OH 1,4,5,6-tetrachloro-7,7-dimethoxy-2,3-bishydroxymethyl-bicyclo(2.2.1)-2,5-heptadiene The compounds of this invention are useful as intermediates in the preparation of thermosetting polyester resins, such as epoxies, and in the preparation of plasticizers for polyvinyl compounds, such as polyvinyl chloride. Further, the compounds of the present invention are useful in the preparation of alkyd resins such as polyesters, and in the preparation of sultones as described in copending application of Weil, Ser. No. 143,539.

In order that those skilled in the art may better understand the present invention, the manner in which it may be practiced, the following specific examples are given.

EXAMPLE 1

To 1.5 moles of hexachlorocyclopentadiene were added 8 grams of epichlorohydrin, 1 gram of m-dinitrobenzene and 100 milliliters of butyl alcohol. The mixture was then heated to a temperature of 130 degrees centigrade and a total of 43 grams of butyne diol was added over a 4 hour period. The reaction temperature was then increased to 135 degrees centigrade, at which temperature it remained for 3 hours, followed by being maintained for a 12 hour period at a temperature of 140 degrees centigrade. The reaction mixture was cooled to room temperature and was filtered. Approximately 450 millimeters of water were employed to wash the filtrate, followed by the addition of $MgSO_4$ to the filtrate for purposes of drying. Toluene was then added to this filtrate and any crystals that formed were removed. A total of 32 grams of product was recovered. The reaction proceeded according to the following equation:

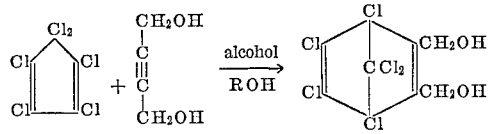

In the same manner and at same amounts or proportions, calcium carbonate, which is representative of the class of alkaline earth metal carbonates and nitriloacetic acid, which is representative of the class of nitriloacetic acids, and epoxides, such as epoxyethane, are employed in place of the epichlorohydrin.

EXAMPLE 2

To 1.5 moles of hexachlorocyclopentadiene were added 8 grams of epichlorohydrin, 0.5 gram of m-dinitrobenzene and 100 milliliters of amyl alcohol. The mixture was then heated to a temperature of about 148 degrees centigrade to about 155 degrees centigrade and a total of 43 grams of butyne diol was added over a 7 hour period. The reaction temperature was then maintained at 155 degrees centigrade for 7 hours. The excess amyl alcohol was then removed by the application of a vacuum. To the crystals which were collected were added 60 cc. of toluene followed by drying and treating the residue with excess hot water to remove any unreacted butyne diol followed by drying. Eighty-seven grams of product were recovered which had a melting point of 156 to 157 degrees centigrade after recrystallization from toluene.

As set forth in Examples 1 and 2 above, and at identical molar ratios, tetrachlorodifluorocyclopentadiene, hexabromocyclopentadiene and tetrachloromethoxycyclopentadiene are employed as starting reagents. The reactions occurring are illustrated by the following equations:

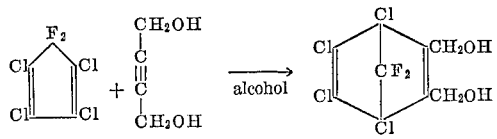

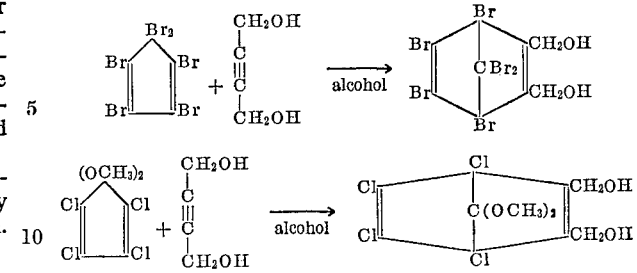

EXAMPLE 3

Following the procedure as set forth in Example 2, hexachlorocyclopentadiene, epichlorohydrin, and butyl alcohol are admixed. The mixture is then heated and butyne diol is added. The product is then recovered as set forth in Example 2.

EXAMPLE 4

To 409 grams of hexachlorocyclopentadiene were added 100 milliliters of amyl alcohol. The mixture was then heated to a temperature of 155 degrees centigrade and a total of 73 grams of butyne diol was added over a 4 hour period. The reaction temperature was maintained at 155 degrees centigrade, at which temperature it remained for 4 hours, followed by maintaining the reaction mixture for a 12 hour period at a temperature of 155 degrees centigrade. The excess amyl alcohol was then removed by application of vacuum. To the crystals which were collected were added about 60 cc. of toluene followed by drying and treating the residue with excess hot water followed by drying of the product. A total of 92 grams of product was recovered. The reaction proceeded according to the following equation:

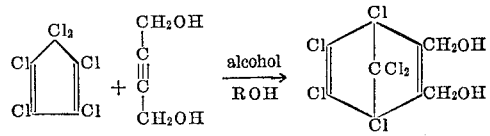

EXAMPLE 5

Preparation of $C_9H_2O_3Cl_6S$ sultone from 1,4,5,6,7,7-hexachloro - 2,3,bis(hydroxymethyl)bicyclo(2.2.1)heptadiene-2,5.

A mixture of 20 parts of 1,2,3,4,7,7-hexachloro-5,6-bis-hydroxymethylbicyclo(2.2.1)heptadiene-2,5 (prepared as in United States Patent 2,951,098) and 75 parts of oleum (20 percent $SO_3$ content) is warmed at 75 degrees centigrade for one-half hour. The resultant clear solution is poured with agitation into water at zero to 10 degrees centigrade (approximately 1000 parts). The precipitated solid is removed by filtration and, after washing with water to remove adhering acid, and drying, the solid is recrystallized from hot heptene to obtain 18 parts of colorless crystalline solid, melting point 130 degrees centigrade.

*Analysis.*—Calcd. for $C_9H_2O_3Cl_6S$: C, 26.9; H. 0.50; Cl, 52.9; S, 7.94. Found: C, 26.84; H. 0.55; Cl 52.8; S, 7.99

The infrared spectrum provides evidence for the —O—$SO_2$— group as well as two vinylic hydrogen-to-carbon bonds (=CH— structures). Molecular weight calcd. 405; found (ebullioscopic in benzene), 388 (±10 percent).

The sultones are useful as pesticides as described in copending application of Weil, Ser. No. 143,539.

While there have been described various embodiments of the invention, the methods and elements described are not intended to be understood as limiting the scope of

What is claimed is:

1. A process for the preparation of a compound represented by the formula

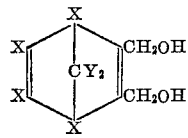

comprising reacting

with butyne diol in the presence of a monohydric alcohol selected from the group consisting of butyl alcohol and amyl alcohol, wherein:
(a) X is halogen;
(b) Y is selected from the group consisting of halogen, hydrogen, and alkoxy;
(c) said reaction is run at a temperature of about 100 degrees to about 200 degrees centigrade;
(d) from about 0.5 to about 3 moles of perhalogenated cyclopentadiene is used per mole of butyne diol; and
(e) from about 20 to about 150 milliliters of said alcohol are used per gram mole of perhalogenated cyclopentadiene.

2. The process of claim 1, wherein X and Y are halogen selected from the group consisting of chlorine, bromine, and fluorine.

3. The process of claim 2, wherein said monohydric alcohol is amyl alcohol.

4. The process of claim 3, wherein X and Y are chlorine.

5. A process for the preparation of a compound represented by the formula

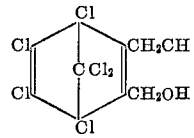

comprising reacting from 0.5 moles to 3 moles of hexachlorocyclopentadiene with 1 mole of butyne diol in the presence of 20 to about 150 milliliters of amyl alcohol for every gram mole of hexachlorocyclopentadiene employed and at a temperature of from between about 130 degrees centigrade to about 155 degrees centigrade to obtain a product yield of at least 65 percent.

6. The process of claim 5, wherein about 1.5 moles of hexachlorocyclopentadiene are used per mole of butyne diol.

7. The process of claim 6, wherein about 70 milliliters of amyl alcohol is used per mole of hexachlorocyclopentadiene.

References Cited

UNITED STATES PATENTS

| | | | |
|---|---|---|---|
| 3,187,010 | 6/1965 | Levin et al. | 260—617 X |
| 2,951,098 | 8/1960 | Hoch et al. | 260—648 |
| 2,993,076 | 7/1961 | Molotsky | 260—617 |
| 3,000,907 | 9/1961 | Feichtinger et al. | 260—617 X |
| 3,007,958 | 11/1961 | Robitschek et al. | 260—617 X |
| 2,983,732 | 5/1961 | Geering et al. | 260—617 X |
| 3,187,010 | 6/1965 | Levin et al. | 260—617 X |
| 3,233,009 | 2/1966 | Carlick et al. | 2—617 X |

FOREIGN PATENTS 960,989 3/1957 Germany.

OTHER REFERENCES

Hoch et al.: J. Am. Chem. Soc., vol. 81, pp. 5413–17 (1959).

LEON ZITVER, *Primary Examiner.*

T. G. DILLAHUNTY, *Assistant Examiner.*

PO-1050
(5/69)

UNITED STATES PATENT OFFICE
CERTIFICATE OF CORRECTION

Patent No. 3,419,903     Dated December 31, 1968

Inventor(s)  Paul E. Hoch

It is certified that error appears in the above-identified patent and that said Letters Patent are hereby corrected as shown below:

Column 5, line 29, the word after "a" should be corrected to read as ---temperature---.
Column 6, line 5, the formula should be corrected to read as

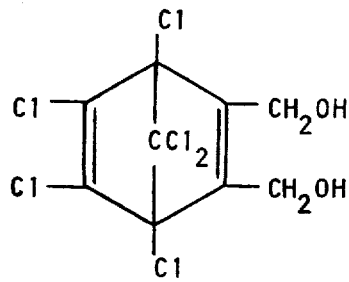

SIGNED AND
SEALED
FEB 24 1970

(SEAL)
Attest:

Edward M. Fletcher, Jr.
Attesting Officer

WILLIAM E. SCHUYLER, JR.
Commissioner of Patents